US008838564B2

(12) United States Patent
Sahni et al.

(10) Patent No.: US 8,838,564 B2
(45) Date of Patent: Sep. 16, 2014

(54) METHOD TO INCREASE CONTENT RELEVANCE USING INSIGHTS OBTAINED FROM USER ACTIVITY UPDATES

(75) Inventors: Saurabh Sahni, Madhya Pradesh (IN); Pankaj Kothari, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 569 days.

(21) Appl. No.: 13/111,928

(22) Filed: May 19, 2011

(65) Prior Publication Data

US 2012/0296920 A1 Nov. 22, 2012

(51) Int. Cl.
| | | |
|---|---|---|
| *G06F 17/30* | (2006.01) | |
| *G06F 7/00* | (2006.01) | |
| *G06Q 30/02* | (2012.01) | |
| *H04L 29/08* | (2006.01) | |

(52) U.S. Cl.
CPC ...... *G06Q 30/0201* (2013.01); *G06F 17/30539* (2013.01); *G06F 17/30616* (2013.01); *H04L 67/22* (2013.01); *H04L 67/02* (2013.01); *G06F 17/30684* (2013.01); *H04L 67/306* (2013.01)
USPC ............................ 707/706; 707/736; 707/748

(58) Field of Classification Search
CPC .......... G06F 17/3053; G06F 17/30864; G06F 17/30867; G06F 17/30; G06F 17/30392; G06F 17/30424; G06F 17/30528; G06F 17/30598
See application file for complete search history.

(56) References Cited

U.S. PATENT DOCUMENTS

| | | | |
|---|---|---|---|
| 6,285,999 B1 | 9/2001 | Page | |
| 2006/0122794 A1* | 6/2006 | Sprague et al. | 702/32 |
| 2008/0134035 A1 | 6/2008 | Pennington et al. | |
| 2009/0063984 A1 | 3/2009 | Agarwal et al. | |
| 2009/0164408 A1* | 6/2009 | Grigorik et al. | 707/1 |
| 2011/0066613 A1 | 3/2011 | Berkman et al. | |
| 2011/0087842 A1 | 4/2011 | Lu et al. | |
| 2011/0288912 A1* | 11/2011 | McCrea et al. | 705/14.2 |
| 2012/0158843 A1* | 6/2012 | Angani et al. | 709/204 |

OTHER PUBLICATIONS

International Search Report and Written Opinion issued in International Patent Application No. PCT/US2012/038532 mailed Nov. 28, 2012.
Agarwal, D. et al., "Online Models for Content Optimization," Proceedings of 22nd Annual Conference on Neural Information Processing Systems, 2008, 8 pages.

* cited by examiner

*Primary Examiner* — Angelica Ruiz
(74) *Attorney, Agent, or Firm* — Martine Penilla Group, LLP

(57) ABSTRACT

Embodiments are directed towards ranking candidate pieces of content for publication based on a weighted combination of an "activity score" and a "trending score". In one embodiment, the activity score measures social activity related to the content, such as how much the content has been shared, viewed, or commented on. In one embodiment, the trending score indicates a measure of trending topics contained in the content. In one embodiment, trending topics are keywords derived from an analysis of social activities across the internet, such as blog posts, wall posts, tweets, comments, ratings, tags, videos, pictures, and the like. In one embodiment, a topic is trending if it surpasses a minimum absolute threshold of social activity as well as a percentage increase in social activity.

20 Claims, 5 Drawing Sheets

METHOD TO INCREASE CONTENT RELEVANCE USING INSIGHTS OBTAINED FROM USER ACTIVITY UPDATES

TECHNICAL FIELD

The present invention relates generally to an improved process for selecting the most relevant pieces of available content. In particular, but not exclusively, the invention relates to selecting pieces of content based on social activities observed across the internet.

BACKGROUND

Today, information consumers have come to expect news and information delivered at all times of the day from all around the world. News outlets employ human editors to select which pieces of content to publish. Editors select pieces of content based on personal knowledge of current events, experience, and intuition. Editors may also select pieces of content based on selections that other editors have made. However, these sources of information are limited, particularly when events unfold quickly and across the globe. Therefore, improved methods of selecting the most relevant pieces of content are needed. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
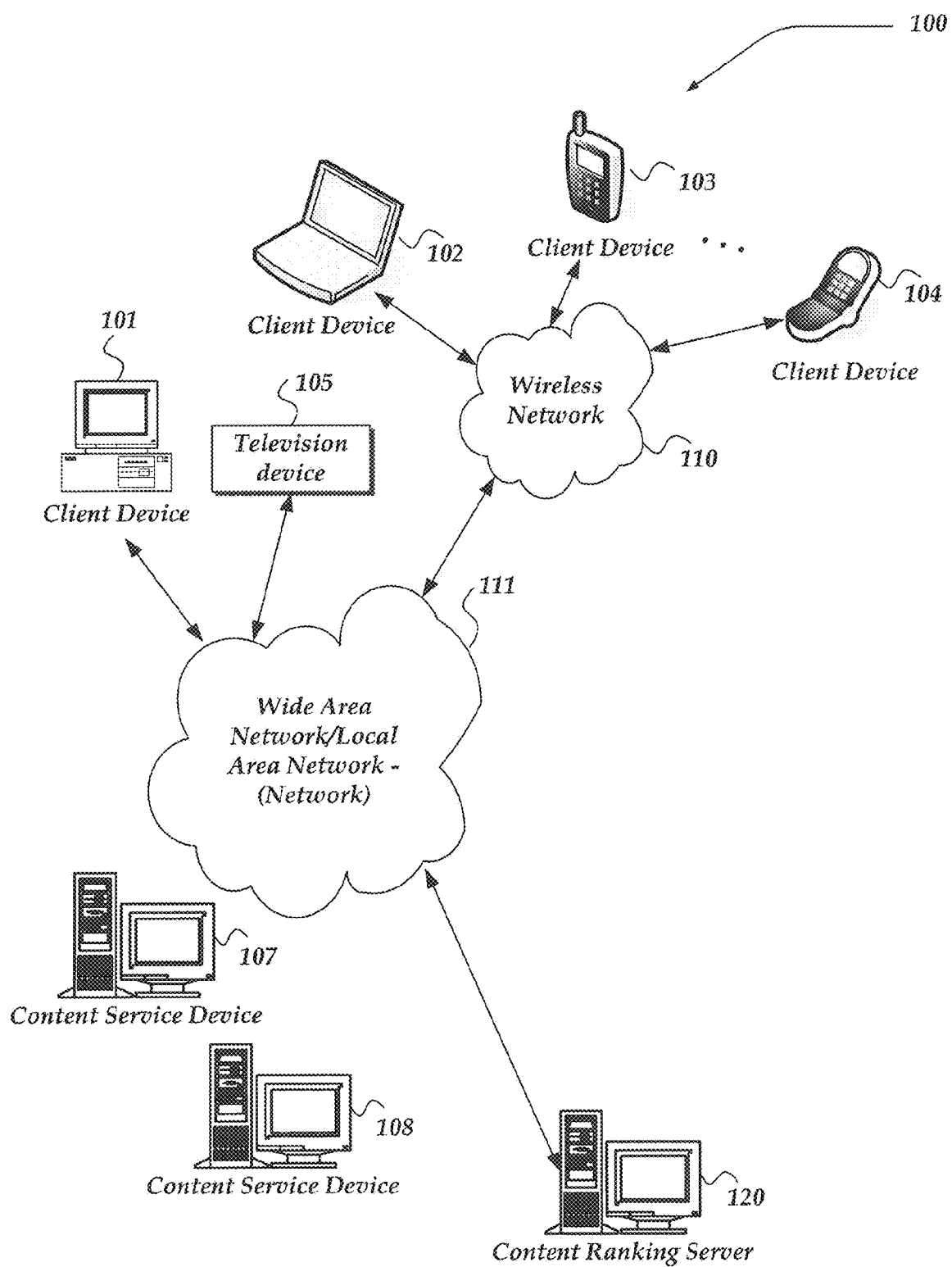
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used, herein, the term "User Generated Content" or UGC refers to any form of content generated by users rather than professional services, such as newspapers, broadcasting services such as television, or the like. Such UGC is herein referred to as UGC documents, but is intended to include messages, webpages, and/or virtually any other form or format useable by a user to generate and/or distribute the user generated content to be, read or shared with another user. Typically, such UGC may be posted on a website, within a user managed blog, a photo website, or the like. However, as noted, such UGC documents include messages, such as email, messages, instant messages, or the like.

As used herein, the term "social activity" refers to any type of computer-based user action that leaves a record other users can view. User actions may be performed using any type of computing device running any type of software. For example, a user may perform an action using a web browser executing on a personal computer, or using an application running on a smartphone. One example of a social activity is posting a book review. Another example of a social activity is commenting on a friend's profile picture.

Social activities can be categorized based on the type of record they leave viewable to other users: text, a rating, a link, a tag, etc. A "text-based social activity" (where text includes plain text, HTML, wikitext, and the like) includes any type of free text expressing thoughts or feelings of the user; such as wall posts, comments, reviews, blog posts, tweets, status updates, and the like. A "rating-based social activity" quantifies how much a user likes something, such as rating a movie as 3-stars or 'liking' another user's wall post. A "link-based social activity" includes any means by which a link may be shared, including posting a link to a social networking site or using a social bookmarking site such as Digg™ or Delicious from Yahoo!®. A "tag-based social activity" includes associating new or existing content with a word or phrase, such as tagging a blog post about baking lasagna with "lasagna".

Social activities can also be categorized based on the type of content they refer to: published content, such as a news story, a picture, etc. A "published content based social activity" includes any social activity pertaining to a piece of published content, such as posting a comment about a piece of published content, linking to a piece of published content, and the like. A "picture-based social activity" includes any social activity pertaining to a picture, such as commenting on a picture, tagging individual people in the picture, 'liking' the picture, etc.

As used herein, the term "trending topic" refers to a keyword derived from observed social activities that has crossed a popularity threshold. For example, the release of a new movie may result in an increase in social activity regarding the lead actor, such that the name of the actor becomes a "trending topic". In one embodiment, crossing a popularity threshold refers to measuring a percentage increase in the amount of social activity. In another embodiment, crossing a popularity threshold refers to measuring an absolute increase in the amount of social activity. Actual percentage increases and absolute increase are configurable, both system-wide and on a per topic basis.

One type of trending topic is a "periodic trending topic", such as "Thanksgiving" or "employment report", referring to a topic that predictably crosses a popularity threshold at predictable dates and/or times. Periodic trending topics may be expected to repeat at a time of day, day of the week, day of the month, holiday, during certain months/years, and the like, or any combination thereof. Another type of trending topic is an "unforeseen trending topic", referring to topic that was previously not popular but has unpredictably become popular since. For example, the death of a head of state may cause an unforeseen trending topic.

As used herein, the term "trending score" refers to a metric derived from a candidate piece of content based on the frequency and/or absolute number of "trending topics" found in that piece of content.

As used herein, the term "high-activity content" refers to content that has experienced an increase in social activity, such as "published content based social activity" described above, beyond a threshold. If a piece of content is already published, high-activity content may additionally be identified by measuring an increase in a number of click-throughs beyond a threshold. In one embodiment, increases beyond a threshold refer to a percentage increase, while in another embodiment increases beyond a threshold refer to an absolute increase.

As used herein, the term "activity score" refers to a metric derived from the level of social activity associated with a candidate piece of content.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards ranking candidate pieces of content for publication based on a weighted combination of an "activity score" and a "trending score". In one embodiment, the activity score measures social activity related to the content, such as how much the content has been shared, viewed, or commented on. In one embodiment, the trending score indicates a measure of trending topics contained in the content. In one embodiment, trending topics are keywords derived from an analysis of social activities across the Internet, such as blog posts, wall posts, tweets, comments, ratings, tags, videos, pictures, and the like. In one embodiment, a topic is trending if it surpasses a minimum absolute threshold of social activity as well as a percentage increase in social activity.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 111, wireless network 110, client devices 101-105, content service devices 107-108, and Content ranking server 120.

One embodiment of client devices 101-105 is described in more detail below in conjunction with FIG. 2. Generally, however, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing various online activities, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network. Client device 105 may include virtually any device useable as a television device. Today, many of these devices include a capability to access and/or otherwise communicate over a network such as network 111 and/or even wireless network 110. Moreover, client device 105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Client devices 101-105 also may include at least one other client application that is configured to receive and/or send content between another computing device, thereby creating social activity. The client application may include a capability to provide and receive textual content, graphical content, audio content, and the like. The client application may further provide information that identifies itself, including a type, capability, name, and the like. In one embodiment, client devices 101-105 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent between other client devices, content service devices 107-108, content ranking server 120, or other computing devices.

Client devices 101-105 may further be configured to include a client application that enables an end-user to log into an end-user account that may be managed by another computing device, such as content service devices 107-108, content ranking server 120, or the like. Such end-user accounts, for example, may be configured to enable the end-user to manage one or more online activities, including for example, search activities, social networking activities, browse various websites, make purchases, sell products/services, communicate with other users, or share attachments with others, or the like. However, participation in such online networking activities may also be performed without logging into the end-user account.

Moreover, client devices 101-105 may be configured to operate to send messages, and other UGC documents for posting through and/or on a content service device, such as 107-108. That is, in one embodiment, a user of client devices 101-105 may select to create and/or otherwise post UGC documents within a blog, webpage, or the like, hosted by one or more of content service devices 107-108.

Wireless network 110 is configured to couple client devices 102-104 and its components with network 111. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 111 is configured to couple network devices with other computing devices, including, content service devices 107-108, content ranking server 120, client devices 101 and 105, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Content service devices 107-108 include virtually any network device usable to operate as website servers to provide content to client devices 101-105. Such content may include, but is not limited to webpage content, advertisements, professionally generated content (non-UGC content), search results, blogs, photograph sharing pages, and/or any of a variety of User Generated Content for access by another client device. Content service devices 107-108 may also operate as a messaging server such as an SMS message service, IM message service, email message service, alert service, or the like. Moreover, content service devices 107-108 may also operate as a File Transfer Protocol (FTP) server, a database server, music and/or video download server, or the like. Additionally, content service devices 107-108 may be configured to perform multiple functions.

Content service devices 107-108 may also be configured to receive messages, and/or any of a variety of other UGC documents that may then be used to identify hot or trending topics. Content service devices 107-108 may, in one embodiment, provide at least access to, and/or a copy of the received messages and other UGC documents to content ranking server 120 for content ranking for one or more time windows. The time windows may be virtually any period of time. However, typical time windows might include, but are not limited to, a current time window—such as an hour, a past thirty minutes, a day, week, month, year, or the like. Content service devices 107-108 may also receive links from content ranking server 120 to one or more of the UGC documents having content determined to be associated with the identified trending topics. Content service devices 107-108 may then display for access by client devices 101-105 the identified trending topics for selected time windows, along with links associated UGC documents.

It is recognized that due to various privacy concerns at, least some of the received UGC documents might either not be examined, and/or not have links to them based on the trend analysis. Thus, in one embodiment, an opt-out, an opt-in, or similar policy might be provided that enables various users to select whether to participate in having their content associated with the links, analysis, or related activities.

One embodiment of content ranking server 120 is described in more detail below in conjunction with FIG. 3. Briefly, however, content ranking server 120 may include any computing device capable of connecting to network 111 to receive a plurality of UGC documents and rank the received UGC documents.

In one embodiment, the documents may be processed in a distributed manner in a plurality of devices such as content ranking server 120 using any of a variety of parallelization strategies. For example, the documents may be partitioned into groups of documents and distributed based on maximizing a dissimilarity of the content within the documents for a given group. Other parallelization strategies may also be used. In any event, each content ranking server 120 may then perform a Modified Sequitur Algorithm (MSA) on the received documents using pipelining, and indexed arrays, to identify phrases as candidate trending topics phrases. In one embodiment, frequent phrases or rules may be encoded as state machines that then enable chaining of the rules through a sequence of symbols. Once the received documents have been analyzed, the identified phrases from each content ranking server 120 may be merged for further analysis, including, removing extraneous co-occurrences of phrases, removing words based on a part of speech analysis, and the like. Then for each identified phrase for a current time window, its frequency may be determined, as well as its frequency in a plurality of other time windows. A weighting for the phrases may then be used to identify a reduced set of candidate phrases. For example, in one embodiment, a plurality of time windows of different sizes may be generated. A phrase is then identified from the candidate phrases as a trending topic if the phrase appears more frequently in a time window of consideration than in the other enclosing windows (a window of time that surrounds or otherwise includes the time window of consideration). Other, windowing approaches may also be employed other than a nested time window approach. For example, in another embodiment, consecutive windows, for example that tie to derivatives or other measures to detect whether a phrase is trending may also be employed, without departing from the scope of the invention.

Links may then be generated to one or more UGC documents associated with the trending topic phrases. The trending topic phrases and links may then be provided to content service devices 107-108 for display to client devices 101-105, or the like. In another embodiment, content, ranking server 120 may display the links and trending topic phrases.

Devices that may operate as content servers 107-108 and/or content ranking server 120 include various network devices, including, but not limited to personal computers, desktop computers, multiprocessor systems, microprocessor-based or programmable consumer electronics, network PCs, server devices, network appliances, and the like. It should be noted that while content ranking server 120 illustrates a single network device useable to rank content, the invention is not so limited, and content ranking may be performed by a plurality of content ranking servers.

Illustrative Client Device

Figure 2:
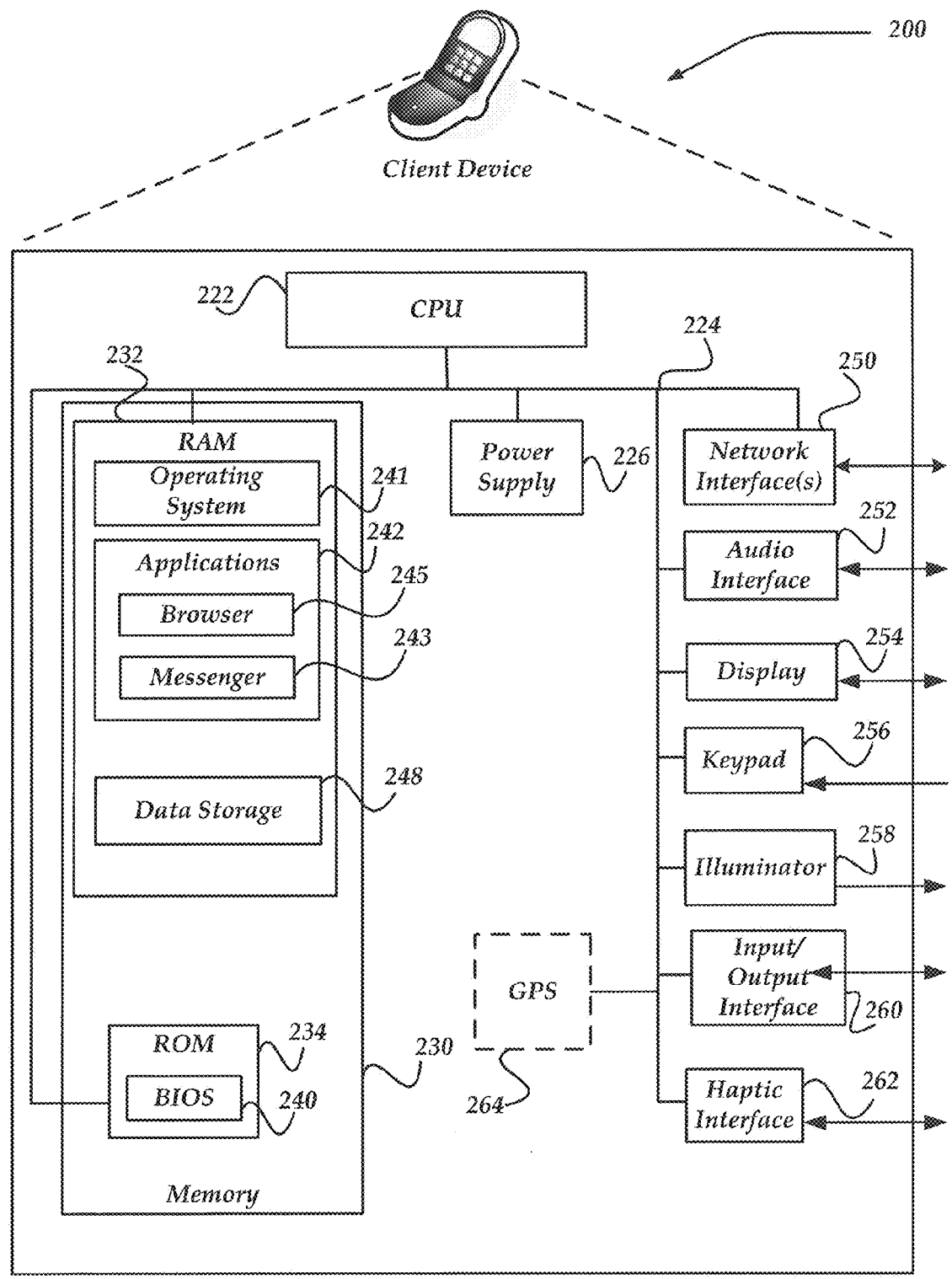
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-105 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian®operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200. The information may then be provided to another device based on any of a variety of events, including being sent as part of a header during a communication, sent upon request, or the like. Data storage 248 may also be employed to store social networking information including address books, buddy lists, aliases, user profile information, or the like. Further, as illustrated, data storage 248 may also store messages, web page content, or any of a variety of user generated content. At least a portion of the information may also be stored on a disk drive or other computer-readable storage device (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messenger 243 and browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed. In one embodiment, browser 245 may enable a user of client device 200 to provide and/or receive user generated content including messages and/or other documents between another computing device for posting, reading, and/or otherwise communicating with another client device.

Messenger 243 may be configured to manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 243 may be configured as an IM, application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols, including, but not limited to various push and/or pull mechanisms for client device 200. In one embodiment, messenger 243 may interact with browser 245 for managing messages. As used herein, the term "message" refers to any of a variety of messaging formats, or communications forms, including but not limited to email, SMS, IM, MMS, IRC, or the like.

Illustrative Network Device

Figure 3:
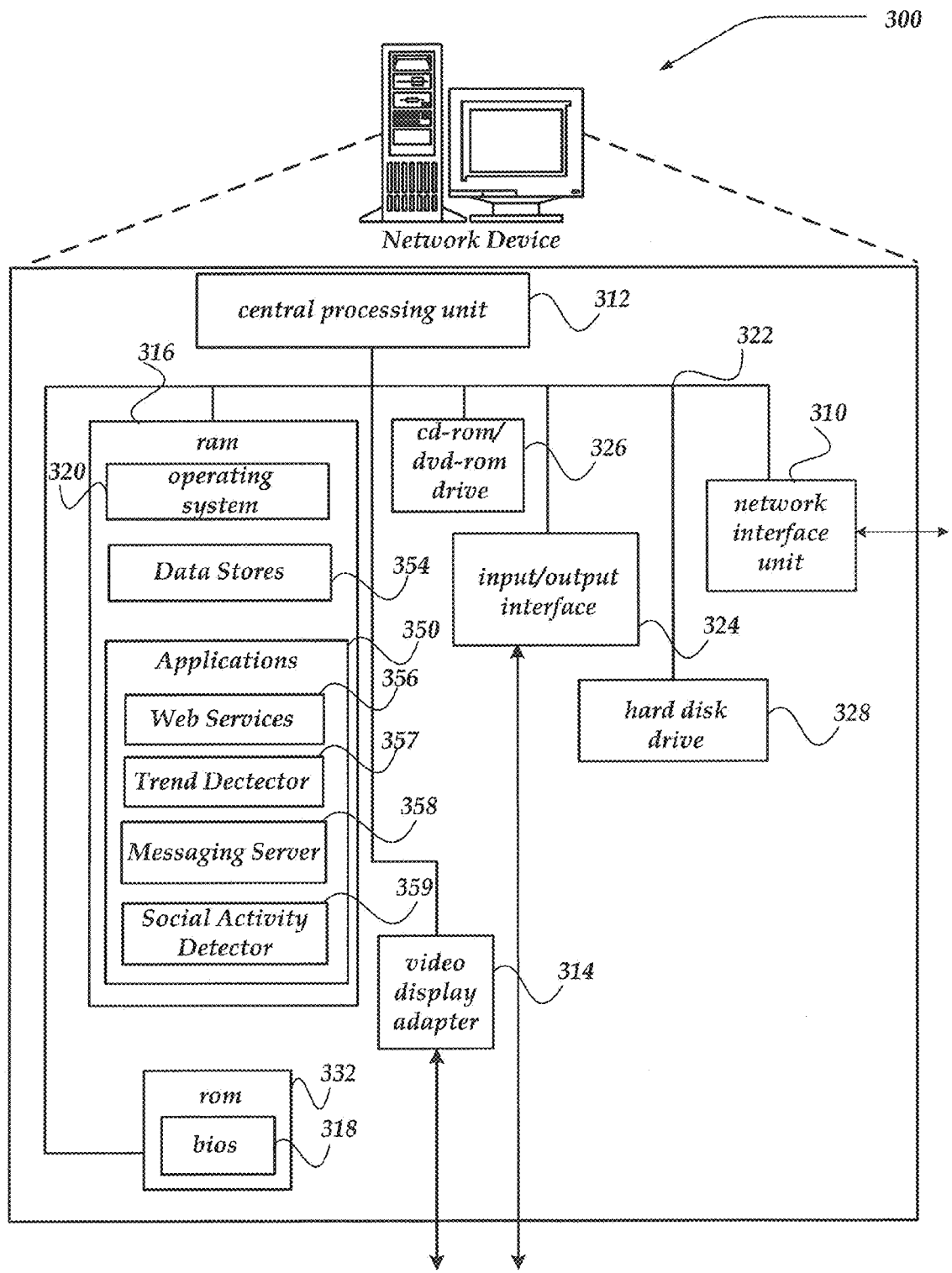
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, content ranking server 120 of FIG. 1. As described below, network device 300 may further include a capability to manage display of identified trending topics with links to UGC documents. However, as noted above, the invention is not so limited, and content ranking may be performed on a different network device than one that enables a display or other access to the content.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer-readable storage media. Computer-readable storage media (devices) may include non-transitory, volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store user account identifiers, user profiles, email addresses, IM addresses, and/or other network addresses; or the like. Data stores 354 may also store various messages, UGC documents, and the like. In one embodiment, storage of such information may be based on a specific user, user account, profile, or the like. Data stores 354 may further include program code, data, algorithms, and the like, for use by a processor, such as central processing unit (CPU) 312 to execute and perform actions. In one embodiment, at least some of data store 354 might also be stored on another component of network device 300, including, but not limited to cd-rom/dvd-rom 326, hard disk drive 328, or the like.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Web services 356, trend detector 357, messaging server 358, and social activity detector 359 may also be included as application programs within applications 350.

Web services 356 represent any of a variety of services that are configured to provide content, including messages, over a network to another computing device. Thus, web services 356 include for example, a web server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

In one embodiment, Web services 356 may receive UGC documents from another network device, such as a client device, or the like. Web services 356 may then enable a user to prepare and/or otherwise manage the UGC documents for access by various other users. As such, web services 356 may allow users to manage blog pages of UGC documents, or the like. However, web services 356 are not limited to blogs, and other web pages may be used for posting of UGC documents.

Messaging server 358 may include virtually any computing component or components configured and arranged to forward messages from message user agents, and/or other message servers, or to deliver messages to a local message store, such as data store 354, or the like. Thus, messaging server 358 may include a message transfer manager to communicate a message employing any of a variety of email protocols, including, but not limited to Simple Mail Transfer Protocol (SMTP), Post Office Protocol (POP), Internet Message Access Protocol (IMAP), NNTP, or the like. Messaging server 358 may also be managed by one or more components of messaging server 358. Thus, messaging server 358 may also be configured to manage SMS messages, IM, MMS, IRC, RSS feeds, mIRC, or any of a variety of other message types. In one embodiment, messaging server 358 may enable users to initiate, and/or otherwise conduct chat sessions, VOIP sessions, or the like. As noted elsewhere, messages are also considered as one type of UGC documents.

Additionally, web services 356 and messaging server 358 may receive a plurality of UGC documents for a given time period, and provide the received UGC documents to Trend Detector 357 for use in identifying trending topics from the content of the documents.

Trend Detector 357 is configured to receive the plurality of UGC documents and to identify trending topics within the documents. In one embodiment, because of the nature of sharing UGC documents, such documents may be considered as being received in a continuous stream of documents. Thus, in one embodiment, the documents may be considered as being associated with at least one time window—the time window for which the documents are received at the Trend Detector 357, or some other device, component, or the like. That is, in one embodiment, the received documents in a continuous stream of documents may be tagged or otherwise identified when they are received.

In one embodiment, the documents may be received by a single one of Trend Detector 357, which may then distribute the documents across the other network devices similar to network device 300 having similar trend detectors 357, such that the distributed documents may be operated on substantially in parallel to identify trending topics.

In one embodiment, trend detector 357 may distribute the plurality of UGC documents using any of a variety of parallelization strategies. For example, in one embodiment, trend detector 357 may select to distribute documents such that each of the plurality of other network devices has a group of documents having a determined maximum likelihood of dissimilar content across the documents. However, other strategies may also be used, including, measuring a distance to a centroid to each of the documents to cluster the documents; using an entropy measurement to determine how to cluster the documents; or even grouping the documents based on a time the document is received.

Once the documents are distributed each trend detector 357 in the plurality of network devices may perform the Modified Sequitur Algorithm (MSA) on the received documents using pipelining, and indexed arrays to identify phrases as candidate trending topics phrases. From the phrases identified by the MSAs, a reduction on the phrases may be performed to remove extraneous co-occurrences of phrases, selected words based on a part of speech analysis, and the like. In one embodiment, a single trend detector 357 may receive the plurality of phrases from each of the other network devices, or each trend detector 357 may perform the further reduction of phrases.

The phrases from each of the network devices may be combined and further analyzed. For one embodiment, for each phrase identified in a current time window, frequency information may be obtained and used to generate weighting values. The weighted values may then be used to identify candidate phrases.

In one embodiment, time windows of different sizes may be used to determine whether a candidate phrase has a higher frequency of occurrence in the window of consideration than in other enclosing windows. The result of this analysis may then be a set of trending topic phrases. Trend Detector 357 may further reduce this set by removing redundant phrases, or the like.

In one embodiment, social activity detector 359 consumes trending topics as generated by trend detector 357 as well as user activity associated with particular pieces of content to rank pieces of content. A discussion of this process is discussed below in conjunction with FIGS. 4-5.

Generalized Operation

The operation of certain aspects of the invention will now be described with respect to FIGS. 4-5. Processes 400-500 may be performed within a single network device, such as network device 300 of FIG. 3, or portions of processes 400-500 may be distributed across a plurality of network devices to enable parallelization of ranking pieces of available content.

Figure 4:
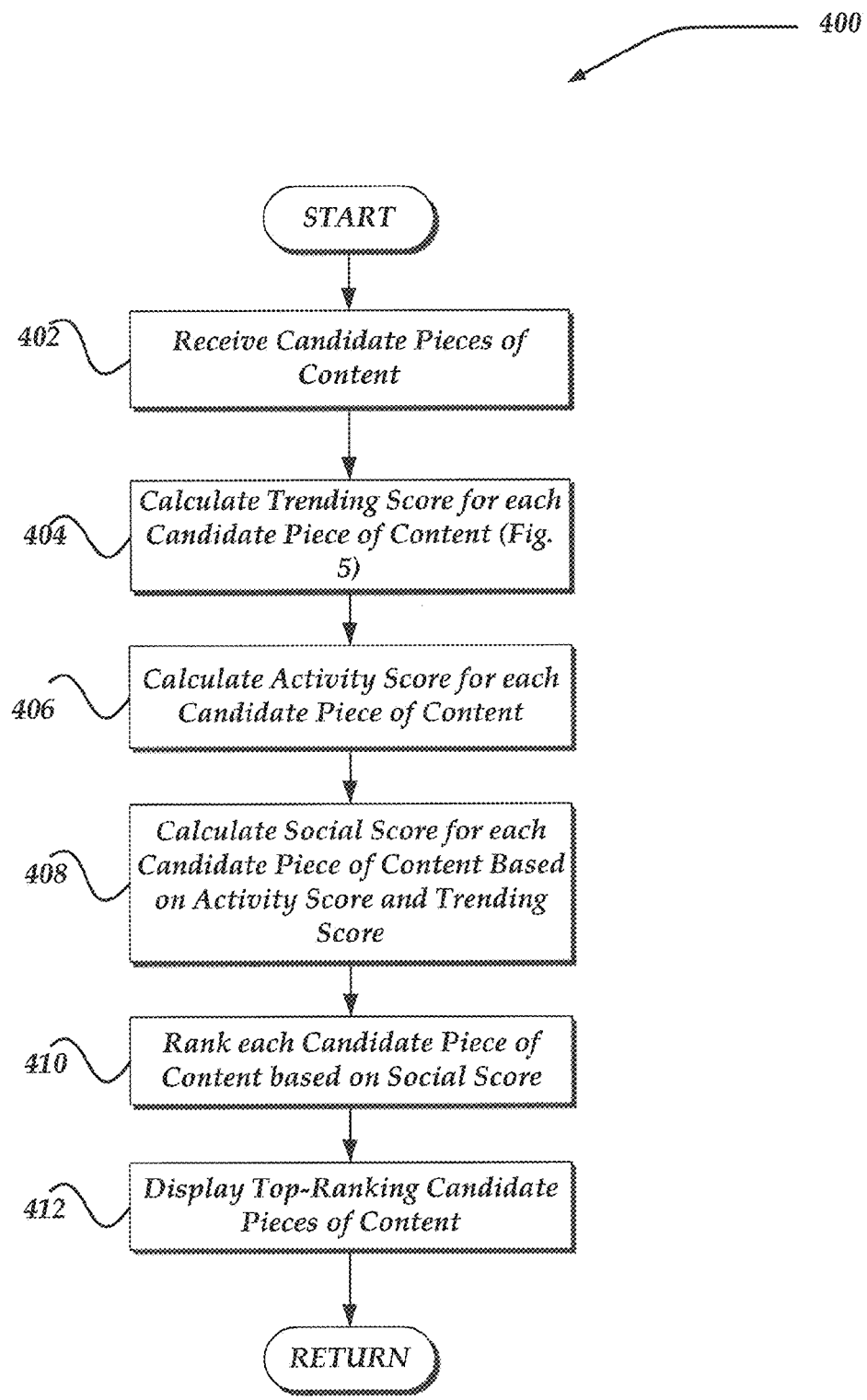
FIG. 4 illustrates a logical flow showing one embodiment of an overview process for ranking pieces of available content.

FIG. 4 illustrates a logical flow diagram generally showing one embodiment of an overview process for ranking pieces of available content. It should be noted however, that other variations may also be employed.

Process 400 begins, after a start block, at block 402, where candidate pieces of content are received. In one embodiment, candidate pieces of content are news stories, however any type of content, such as web pages, advertisements, scholarly publications, patents, books, magazine articles, blogs, or any other corpus of text-based documents, are similarly contemplated. For example, in another embodiment, advertisements may be ranked for display on a web page in part based on process 400, thereby increasing the relevance and value of selected advertisements. In one embodiment candidate pieces of content are received from news agencies such as the Associated Press® or Thomson Reuters®, while additionally or alternatively pieces of content may be received by crawling the internet, user submissions, and the like.

Flowing next to block 404, a trending score for each candidate piece of content is calculated. Details of this calculation are described herein in conjunction with FIG. 5.

Flowing next to block 406, an activity score for each candidate piece of content is calculated. In one embodiment, an activity score is a score of social activity pertaining to a particular piece of content. Social activities may include methods of sharing a piece of content, methods of commenting on, a piece of content, methods of rating a piece of content, and the like. In one embodiment, an activity score is calculated as a weighted sum of some or all individual social activity metrics.

Examples of social activities that share a piece of content include: posting a piece of content to a social bookmarking site, posting a link to (or embedded copy of) a piece of content to a social networking site such as YouTube®, Facebook®, or Twitter®, or the like, emailing a link to (or an embedded copy of) a piece of content, and the like. Examples of social activities that comment on a piece of content include: posting to a comments section of a web page, commenting on a link another user has posted to a social networking site, reviewing a book on a website such as Amazon.com®, and the like. Examples of social network activities that rate content include "liking" a news article, rating a movie on a "5-star" scale, and the like.

In one embodiment, social activities may be measured quantitatively, qualitatively, or some combination thereof. One example of a quantitative measure of social activity is counting the number of times a piece of content is shared. One example of a qualitative measure of social activity is the average length of a comment.

In one embodiment, demographic information about users who created the measured social activity may be considered when determining the activity score, such as user age/gender/ethnicity. For example, if users from a wide spectrum of demographics are noticed to be creating social activity about a particular piece of content, the calculated social activity score of that piece of content may be greater than if a particular demographic is generating the social activity.

In one embodiment, an activity score is additionally based on click-through data, such as the number of times a piece of content is clicked on or rolled-over on a web-page. In one embodiment, relative click through data, referring to a number of clicks relative to other pieces of content, is included in the activity score. In another embodiment, an absolute number of clicks are included in the activity score.

Flowing next to block 408, a social score of each candidate piece of content is calculated based on an activity score and a trending score of the piece of content. In one embodiment the social score is a weighted sum of the activity score and the trending score.

Flowing next to block 410, each of the candidate pieces of content are ranked based on their respective social scores. Next, at block 412, the top-ranked candidate pieces of content are displayed. In one embodiment, the top-ranking pieces of content are rendered as a list of hyperlinks, such as may be included on a front-page of an internet portal or newspaper's website. In another embodiment, where the pieces of content include advertisements, the top-ranked pieces of content may be displayed in a web browser, smart phone application, and the like. In one embodiment, top-ranking pieces of content may be presented to human editors for selection. In one embodiment the top-ranking pieces of content may present a more narrow choice of pieces of content, enabling the human editor to spend more time choosing which pieces of content to publish. In another embodiment, the breadth of information used to generate the top-ranking pieces of content, such as aggregated user activity streams, enables presenting human editors with pieces of content that may otherwise have been overlooked. For example, if civil unrest was occurring overseas, during a time when, limited editorial bandwidth exists to select pieces of content, process 400 may bring pieces of content to an editor's attention that prior art implementations such as web searches might, have missed. The flow then proceeds to a return block.

Figure 5:
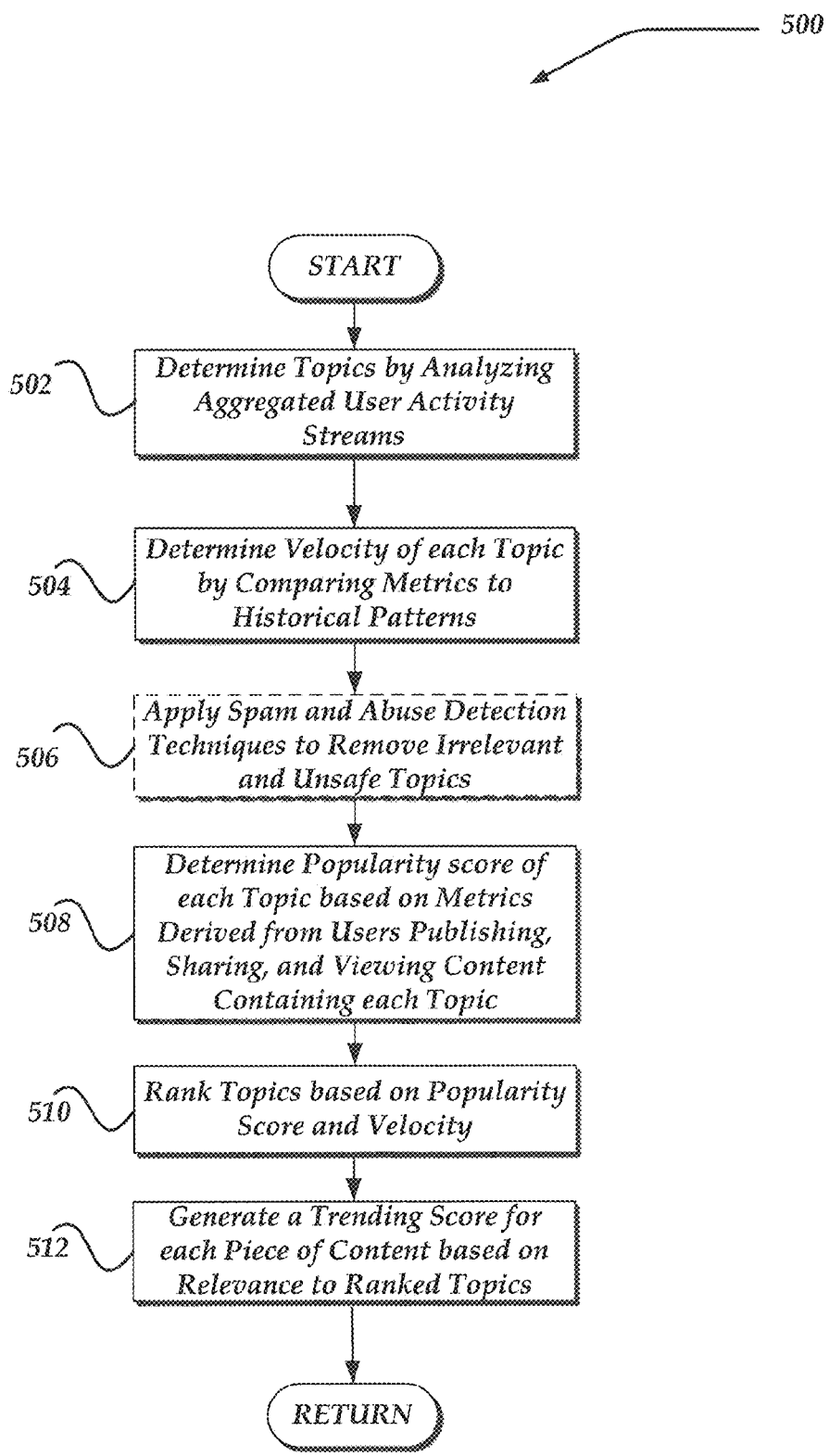
FIG. 5 illustrates a logical flow showing one embodiment of a process for calculating a trending score.

FIG. 5 illustrates a logical flow diagram generally showing one embodiment of an overview process for calculating a trending score. It should be noted however, that other variations may also be employed.

Process 500 begins, after a start block, at block 502, where a plurality of topics are determined by analyzing a plurality of aggregated user activity streams. In one embodiment, an aggregated user activity stream includes social activity created by a user across one or more websites, including blogs, social networking sites such as Facebook®, YouTube®, Twitter®, MySpace®, news websites, and the like. For example, a social activity stream may include comments a user has made, blog posts a user has made, tags a user has applied to a news story or blog post, comments a user has made on a picture, and the like. In one embodiment, user activity streams are continuously updated by crawling the interne, thereby providing real-time or near real-time social activity data.

In one embodiment a sliding timeframe determines how much and what portion of an aggregated user activity stream to analyze. For example, in one embodiment, the most recent two hours of user activity stream data is considered. However, virtually any amount of time is similarly contemplated, including 10 minutes, 30 minutes, 3 hours, 12 hours, 2 days, etc. Also, the timeframe need not include the most recent data—any date/time range may be considered, such as when performing a historical analysis of topics. In one embodiment, aggregated user activity streams include a collection of social activity content such as comments, blog posts, ratings (book and movie ratings), tags, and the like as discussed herein.

In one embodiment, a topic comprises a keyword or a plurality of keywords, such as "Halloween", "black Friday", or "Riots in country X". In one scenario, such as "Black Friday", the existence of the event that causes a topic's popularity to increase is known in advance. However, other events cannot be anticipated, such as a riot of political dissidents. In some cases, particularly when events are happening overseas, editorial bandwidth may not be available to select relevant pieces of content for display. However, it is beneficial to place a front-page article about fast developing events.

Flowing next to block 504, a velocity of each topic is determined by comparing a metric of the determined topic with historical metrics of the determined topic. In one embodiment, the historical metric is an average historical volume, which in one embodiment is an average hourly volume calculated by dividing a total number of occurrences of a topic over a period of time by the number of hours in that period of time. However, any timeframe may be used when calculating an average historical volume, including average volume per minute, per 30 minutes, per 2 hours, per day, etc. In this embodiment, if the ratio of measured volume to average historical volume crosses a velocity threshold, the topic's velocity is high. The velocity threshold is configurable, and may vary based on implementation, but examples include a volume that is 1.5× the average hourly volume, 2× the average hourly volume, 3× the average hourly volume, 10× the average hourly volume, and the like.

In addition to determining average historical volume, historical metrics may be analyzed to detect patterns, such as high topic volume at particular times of day, days of the week, months, seasons, etc. For example, a topic such as "stock market" may be very popular weekdays at 4 pm E.S.T., when the New York Stock Exchange closes for the day, whereas Saturday at 2 am E.S.T. "stock market" may have significantly less volume. In these scenarios, experiencing a volume greater than the average hourly volume is expected at certain times of day (or days of the week, months, seasons, etc.). Thus, a volume that is 2× the average hourly volume of a topic may be high at certain times of the day, such as 2 am E.S.T. for the keyword "stock market", but not at other times of day, such as 4 pm.

Some topics may have a velocity that exceeds the velocity threshold, but have a very low absolute volume. For example, if two friends regularly use a term they coined, and the term is later adopted by a larger group of friends, the topic's volume could increase substantially. However, such a topic is unlikely to be relevant to anyone else, as determinable by having a low absolute volume. In one embodiment, topics that have less than a minimum volume threshold are excluded from further consideration, regardless of velocity. In another embodiment, a topic's velocity may be reduced if it's absolute volume is low—the lower the absolute volume, the greater the velocity is reducted.

As another example, consider the topic "Black Friday". Historically, "Black Friday" is much more popular from mid to late November than at any other time of the year. As such, if the topic "Black Friday" is measured to be large in mid-November compared to the hourly average, "Black Friday" would still have a low velocity. However, "Black Friday" has a large volume during March, such may be the case if a famous band released an album entitled "Black Friday" during March, the velocity would be high, even if the absolute volume of "Black Friday" in March was less than during mid-November.

Flowing next to block 506, a spam filter or other abuse detection technique is optionally applied to the determined topics, removing irrelevant or unsafe topics. For example, topics that are inappropriate for a general audience may be removed. Also, detection of artificial manipulation of the topics is detected, these topics may be removed or their velocities reduced.

Flowing next to block 508, another factor in the trending score is calculated—a popularity score based on metrics derived from users publishing content that contains a topic and how users receive the published content (sharing, viewing, etc.) containing that topic. For example, a topic may have high velocity, but existing pieces of content that contain that topic are not well received, resulting in a low popularity score. On the other hand, if pieces of content that contain a topic are particularly popular, in that they are shared or viewed by many users, that topic's popularity score will increase.

Flowing next to block 510, topics are ranked based on their popularity score and their velocity. Flowing next to block 512, a trending score for each piece of content is generated based on relevance to the ranked topics. For example, pieces of content that contain many references to a highly ranked topic may receive a larger trending score than pieces of content that contain fewer references or no references to a highlight ranked topic. The flow then proceeds to a return block.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
 a processor; and
 a memory storing instructions that, when executed by the processor, cause the network device to perform actions including:
 receiving a plurality of candidate pieces of content;

receiving a plurality of aggregated user activity streams, each aggregated user activity stream containing a record of at least one social activity performed by a user on a web page;

extracting a plurality of topics from the plurality of aggregated user activity streams;

calculating a velocity of each extracted topic based on a difference between a metric of the topic over a first period of time and a metric of the topic over a second period of time, wherein the second period of time came before the first period of time;

calculating a trending score for each of the plurality of candidate pieces of content based on a measure of the velocities of one or more extracted topics contained in the candidate piece of content;

ranking the plurality of candidate pieces of content based on the trending score; and publishing one or more of the plurality of candidate pieces of content based on the ranking.

2. The network device of claim 1, wherein the trending score is also based on a popularity score, wherein the popularity score includes a measure of social activity associated with one or more pieces of content each of which reference the topic.

3. The network device of claim 1, wherein the ranking is also based on an activity score calculated for each of the plurality of candidate pieces of content, wherein the activity score is calculated based on a measure of social activity associated with the plurality of candidate pieces of content.

4. The network device of claim 1, wherein the velocity of each topic is calculated based on an average of historical metrics taken over a plurality of related periods of time including particular hours of the day over one or more days, particular days of the week over one or more weeks, particular weeks of the year over one or more years, particular months of the year over one or more years, particular seasons of the year over one or more years, or particular holidays over one or more years.

5. The network device of claim 2, wherein calculating the trending score further includes ranking topics based on the velocity of each topic and the popularity score of each topic and calculating the relevance of each of the plurality of candidate pieces of content based on the ranked topics.

6. The network device of claim 1, wherein the metric of the topic over the first period of time includes a number of times a topic is contained within the aggregated user activity streams during the first period of time.

7. The network device of claim 1, wherein a social activity includes any type of free text expressing thoughts or feelings of a user, a quantification of how much a user likes something, a means by which a link to a piece of content may be shared, or a word or phrase associated with a piece of content.

8. A method implemented on a computing machine, comprising:

receiving a plurality of candidate pieces of content;

receiving a plurality of aggregated user activity streams, each aggregated user activity stream containing a record of at least one social activity performed by a user on a web page;

extracting a plurality of topics from the plurality of aggregated user activity streams;

calculating a velocity of each extracted topic based on a difference between a metric of the topic over a first period of time and a metric of the topic over a second period of time, wherein the second period of time came before the first period of time;

calculating a trending score for each of the plurality of candidate pieces of content based on a measure of the velocities of one or more extracted topics contained in the candidate piece of content;

ranking the plurality of candidate pieces of content based on the trending score; and publishing one or more of the plurality of candidate pieces of content based on the ranking.

9. The method of claim 8, wherein the trending score is also based on a popularity score, wherein the popularity score includes a measure of social activity associated with one or more pieces of content each of which reference the topic.

10. The method of claim 8, wherein the ranking is also based on an activity score calculated for each of the plurality of candidate pieces of content, wherein the activity score is calculated based on a measure of social activity associated with the plurality of candidate pieces of content.

11. The method of claim 8, wherein the velocity of each topic is calculated based on an average of historical metrics taken over a plurality of related periods of time including particular hours of the day over one or more days, particular days of the week over one or more weeks, particular weeks of the year over one or more years, particular months of the year over one or more years, particular seasons of the year over one or more years, or particular holidays over one or more years.

12. The method of claim 9, wherein calculating the trending score further includes ranking topics based on the velocity of each topic and the popularity score of each topic and calculating the relevance of each of the plurality of candidate pieces of content based on the ranked topics.

13. The method of claim 8, wherein the metric of the topic over the first period of time includes a number of times a topic is contained within the aggregated user activity streams during the first period of time.

14. The method of claim 8, wherein a social activity includes any type of free text expressing thoughts or feelings of a user, a quantification of how much a user likes something, a means by which a link to a piece of content may be shared, or a word or phrase associated with a piece of content.

15. A non-transitory computer-readable storage medium storing instructions that when executed by a processor cause actions to be performed, comprising:

receiving a plurality of candidate pieces of content;

receiving a plurality of aggregated user activity streams, each aggregated user activity stream containing a record of at least one social activity performed by a user on a web page;

extracting a plurality of topics from the plurality of aggregated user activity streams;

calculating a velocity of each extracted topic based on a difference between a metric of the topic over a first period of time and a metric of the topic over a second period of time, wherein the second period of time came before the first period of time;

calculating a trending score for each of the plurality of candidate pieces of content based on a measure of the velocities of one or more extracted topics contained in the candidate piece of content;

ranking the plurality of candidate pieces of content based on the trending score; and publishing one or more of the plurality of candidate pieces of content based on the ranking.

16. The computer-readable storage medium of claim 15, wherein the trending score is also based on a popularity score, wherein the popularity score includes a measure of social activity associated with one or more pieces of content each of which reference the topic.

17. The computer-readable storage medium of claim 15, wherein the ranking is also based on an activity score calculated for each of the plurality of candidate pieces of content, wherein the activity score is calculated based on a measure of social activity associated with the plurality of candidate pieces of content.

18. The computer-readable storage medium of claim 15, wherein the velocity of each topic is calculated based on an average of historical metrics taken over a plurality of related periods of time including particular hours of the day over one or more days, particular days of the week over one or more weeks, particular weeks of the year over one or more years, particular months of the year over one or more years, particular seasons of the year over one or more years, or particular holidays over one or more years.

19. The computer-readable storage medium of claim 16, wherein calculating the trending score further includes ranking topics based on the velocity of each topic and the popularity score of each topic and calculating the relevance of each of the plurality of candidate pieces of content based on the ranked topics.

20. The computer-readable storage medium of claim 15, wherein the metric of the topic over the first period of time includes a number of times a topic is contained within the aggregated user activity streams during the first period of time.

\* \* \* \* \*